United States Patent [19]
Becker et al.

[11] Patent Number: 5,127,085
[45] Date of Patent: Jun. 30, 1992

[54] RIDE-THROUGH PROTECTION CIRCUIT FOR A VOLTAGE SOURCE INVERTER TRACTION MOTOR DRIVE

[75] Inventors: Robert W. Becker, Warrenville; Alexander C. Crosman, III, Downers Grove, both of Ill.

[73] Assignee: General Motors Corporation, Detroit, Mich.

[21] Appl. No.: 677,912

[22] Filed: Apr. 1, 1991

[51] Int. Cl.$^5$ ................................. H02H 7/09
[52] U.S. Cl. ...................... 388/903; 318/434; 361/18; 361/30; 361/111; 323/265; 363/55; 363/58
[58] Field of Search ............ 363/37, 51, 34, 55, 363/58; 361/18, 21, 31, 57, 93, 111, 30, 33; 323/234, 265, 266, 269, 270, 271, 282; 318/434; 388/903

[56] References Cited

U.S. PATENT DOCUMENTS

| | | |
|---|---|---|
| 3,597,655 | 8/1971 | Forte . |
| 3,634,728 | 1/1972 | Moury ........................ 307/240 X |
| 3,660,720 | 5/1972 | Samm et al. . |
| 3,699,300 | 10/1972 | Buerki . |
| 3,809,999 | 5/1974 | Smith ........................ 323/17 |
| 3,889,849 | 6/1975 | Nagel . |
| 4,068,277 | 1/1978 | Simokat ...................... 361/55 |
| 4,286,301 | 8/1981 | Pham Van .................... 361/3 |
| 4,570,212 | 2/1986 | Edwards et al. .............. 363/138 |
| 4,665,458 | 5/1987 | Matsuoka et al. .............. 361/18 |
| 4,675,798 | 6/1987 | Jost et al. ................... 363/54 |
| 4,686,618 | 8/1987 | McMurray ................... 363/58 |
| 4,745,513 | 5/1988 | McMurray ................... 361/56 |
| 4,843,533 | 6/1989 | Roof et al. .................. 363/55 |
| 5,034,676 | 7/1991 | Kinzalow .................... 323/268 |

Primary Examiner—Bentsu Ro
Attorney, Agent, or Firm—Mark A. Navarre

[57] ABSTRACT

A traction motor drive protection circuit which provides the inverter protection capability of a conventional commutation arrangement, but which limits or eliminates fault currents that stress the internal elements of the alternator and traction machines. A series protection thyristor is connected between a commutation thyristor and the inverter circuit to block motor fault currents, and RC elements are connected in series with the commutation thyristor to limit alternator fault currents. Normal inverter gating is continued in the presence of a fault, to circulate the stored inductive energy and discharge the filter capacitor, providing a "ride-through" operation which is substantially transparent to the traction motor. The RC elements in the commutation circuit not only limit the alternator faul current, and hence the stress on the eommutation thyristor, but also commutate the commutation thyristor to provide automatic reset capability.

7 Claims, 2 Drawing Sheets 5,127,085

RIDE-THROUGH PROTECTION CIRCUIT FOR A VOLTAGE SOURCE INVERTER TRACTION MOTOR DRIVE

This invention relates to traction motor drive arrangements including a voltage source inverter, and more particularly, to a circuit for protecting the inverter in the event of overvoltage and overcurrent conditions.

BACKGROUND OF THE INVENTION

Motor drive arrangements of the above type are often employed in AC electric drive applications, such as electric vehicles or locomotives. In some applications, the supply voltage is provided by a battery pack; in other applications, by an engine driven alternator and rectifier assembly. In either case, the source provides a DC supply voltage which the voltage source inverter (VSI) applies to the phase windings of the AC motor.

Various protection schemes, such as inverter fuses and source voltage control, have been developed to protect the switching devices of the inverter in the event of transient overcurrent or overvoltage conditions, and to minimize the corresponding source and motor torque transients. However, fuses must be reset to resume operation once a fault occurs, and source voltage controls are typically not fast enough to adequately protect the inverter switching devices.

According to another protection scheme, a high capacity thyristor, referred to herein as a crowbar device, is connected across the DC supply voltage and gated to a conductive state upon detection of an overvoltage or overcurrent condition. When the transient condition subsides, the thyristor is commutated and normal operation resumes. A typical crowbar arrangement in a locomotive traction drive is depicted in FIG. 1.

Referring to FIG. 1, the rectified output voltage of an engine driven alternator 10 is applied to the phase windings 12a, 12b and 12c of an AC traction motor 12 via filter capacitor Cf and the thyristors 14–24 of a voltage source inverter 25. Freewheeling diodes 26–36 parallel each of the thyristors 14–24 to protect the respective thyristors by circulating inductive motor currents at the commutation intervals. A crowbar thyristor 42 is connected in parallel with the inverter 25 and gated conductive to protect the inverter thyristors 14–24 during overvoltage and overcurrent conditions. The element Lm designates lead inductance between the alternator and the crowbar thyristor 42.

When the crowbar thyristor 42 is gated into conduction in response to a detected overvoltage or overcurrent condition, the inverter thyristors are commutated and the traction motor 12 operates as a generator due to the magnetic flux stored in its windings. In this mode, the motor windings supply an unbalanced transient current Im to the crowbar thyristor 42 via a pair of freewheeling diodes. In FIG. 1, the current Im is supplied via freewheeling diodes 26 and 36, indicating that the inverter thyristors 16 and 22 had been conductive at the time of the fault. A similar condition occurs in the alternator 10, which also supplies a rectified unbalanced transient current Ia to the crowbar thyristor 42. Additional crowbar current is supplied by the filter capacitor Cf.

While the crowbar thyristor 42 may be sized to withstand the combined motor, alternator and capacitor fault currents, the transient currents Im and Ia each produce transient torques and magnetic forces in the respective machines 10, 12. These torques and forces severely stress various internal elements of the machines 10, 12, possibly contributing to premature failure. Particularly vulnerable machine elements include shafts, stator end-windings and rotor field poles.

SUMMARY OF THE PRESENT INVENTION

The present invention is directed to an improved traction motor drive protection circuit which provides the inverter protection capability of a conventional crowbar arrangement, but which limits or eliminates fault currents that stress the internal elements of the alternator and traction machines.

According to this invention, the rectified alternator output terminals are connected to the inverter via a series connected thyristor and a parallel connected commutation circuit. The commutation circuit comprises a commutation thyristor connected in series with the parallel combination of a commutation capacitor and a commutation resistor. During normal operation, the series connected thyristor is supplied with a gate signal to enable the alternator to supply current to the motor windings through the inverter.

In fault conditions, the gate signal of the series connected thyristor is interrupted, and the commutation thyristor is supplied with a gate signal. This commutates the series connected thyristor to isolate the alternator from the inverter and motor, while providing a current path for maintaining the alternator current. Normal inverter gating is continued to circulate the stored inductive energy of the motor and to discharge the inverter filter capacitor, providing a "ride-through" operation which is substantially transparent to the traction motor. The voltage developed across the commutation capacitor eventually commutates the commutation thyristor, and the commutation resistor discharges the commutation capacitor to provide automatic reset capability.

DETAILED DESCRIPTION OF THE INVENTION

Figure 1:
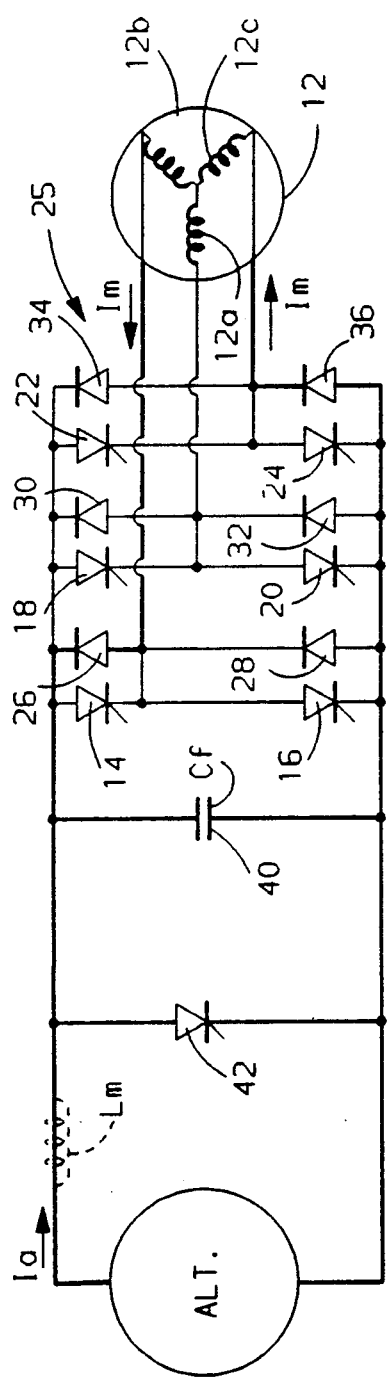
FIG. 1 is a circuit diagram of a conventional commutation protection arrangement applied to an AC traction motor drive including a voltage source inverter.
Figure 2:
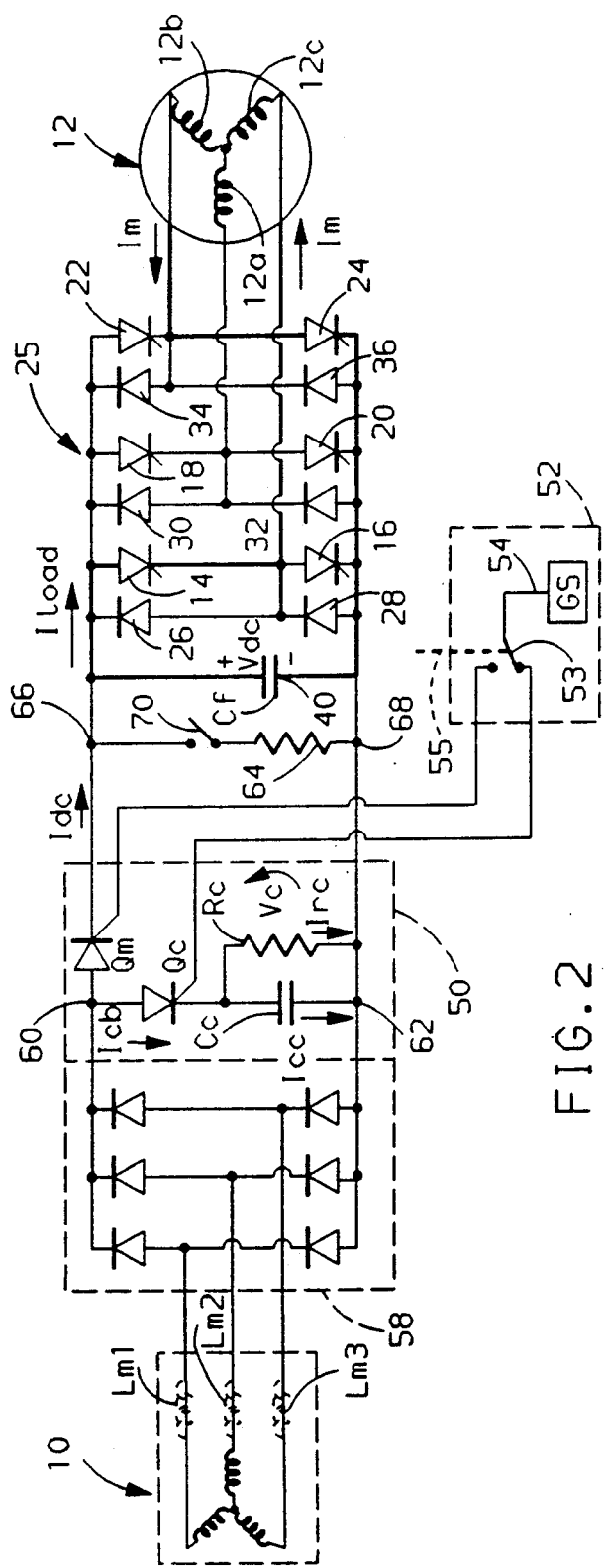
FIG. 2 is a circuit diagram of the ride-through protection circuit of this invention as applied to an AC traction motor drive including a voltage source inverter.

Referring to FIG. 2, the protection circuit of this invention is designated generally by the reference numeral 50. Various other elements of the AC motor drive common to the system of FIG. 1 have been assigned the same reference numerals. Thus, engine driven alternator 10 is connected to the phase windings 12a, 12b and 12c of AC traction motor 12 via filter capacitor Cf and the thyristors 14–24 of voltage source inverter 25, and freewheeling diodes 26–36 parallel each of the thyristors 14–24 to protect the respective thyristors at commutation intervals.

On a more detailed level, the three-phase AC output of alternator 10 is rectified by a full-wave bridge rectifier 58 to define positive and negative DC supply terminals 60 and 62. The elements Lm1, Lm2 and Lm3 designate lead inductances between the alternator and the bridge rectifier 58. The protection circuit 50 is connected to the supply terminals 60, 62, and a resistor grid 64 is selectively connected between the terminals 66 and 68 via contactor 70 to provide dynamic braking of the traction motor 12.

The protection circuit 50 comprises a series thyristor Qm, a commutation thyristor Qc and a parallel RC network comprising resistor Rc and capacitor Cc. The series thyristor Qm is connected between the positive supply terminal 60 and the resistor grid terminal 66. The anode of commutation thyristor Qc is connected to positive supply terminal 60, and the parallel combination of resistor Rc and capacitor Cc connects the cathode of commutation thyristor Qc to negative supply terminal 62.

A control unit, schematically illustrated by the elements within box 52, includes a thyristor gate signal generator GS and logic elements, designated by the controlled switch 53, for applying the gate signal on line 54 to either series thyristor Qm or commutation thyristor Qc, depending on the state of a fault detection line 55. The control unit may perform other functions as well, including the gating of inverter thyristors 14-24.

In normal operation of the motor drive, the gate signal on line 54 is applied to series thyristor Qm to connect the positive supply terminal 60 to inverter 25. In response to the detection of an overvoltage or overcurrent condition, however, the gating of series thyristor Qm is interrupted, and gate signal on line 54 is supplied to the commutation thyristor Qc. Initially, the voltage Vc across capacitor Cc is zero, and series thyristor Qm is commutated as filter capacitor Cf begins to discharge through commutation thyristor Qc, capacitor Cc and resistor Rc. During this interval, current is also supplied to capacitor Cc and resistor Rc by alternator 10.

After commutation of the series thyristor Qm occurs, the filter capacitor Cf and inverter are effectively isolated from positive supply terminal 60. On the supply side, alternator 10 continues charging capacitor Cc, ensuring that there are no sudden changes in the alternator winding current, and thereby limiting the alternator voltage and torque transients to a safe level. Resistor Rc is chosen so that the capacitor voltage Vc just overshoots the DC source voltage to commutate the commutation thyristor Qc. Following the commutation, resistor Rc continues to discharge capacitor Cc.

On the load side of series thyristor Qm, the discharging of the filter capacitor Cf and the circulation of inductive winding energy occurs via the normal gating of inverter thyristors 14-24. That is, the normal gating of thyristors 14-24 continues through the fault condition, ensuring that there are no sudden changes in the motor winding current, and thereby limiting the motor torque transients to a relatively low level. In the presence of dynamic braking, the filter capacitor Cf would also discharge through the resistor grid 64.

Once the fault condition is over, normal operation is initiated by once again supplying the gate signal on line 54 to series thyristor Qm. At this point, the commutation capacitor Cc will have been discharged by resistor Rc so that the protection circuit 50 will be reset and ready for the next overvoltage or overcurrent detection.

Figure 3:
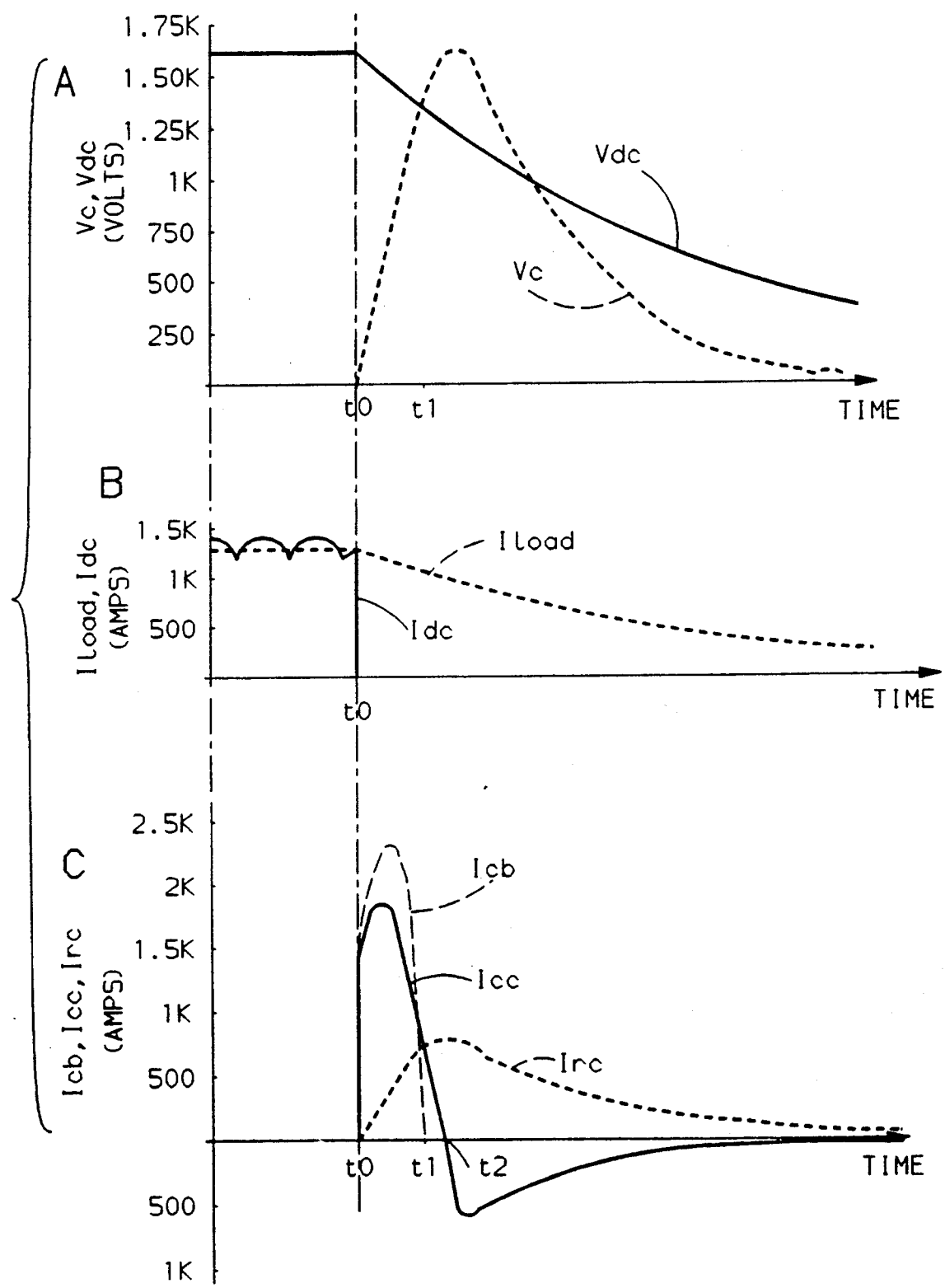
FIG. 3 graphically depicts the operation of the protection circuit set forth in FIG. 2.

The operation of the protection circuit 50 in a typical application is graphically illustrated by the Graphs A-C of FIG. 3. Graph A depicts the inverter input voltage Vdc and capacitor voltage Vc; Graph B depicts the load current Iload and DC link current Idc; and Graph C depicts the commutation thyristor current Icb, the capacitor current Icc and the resistor current Irc, each graph being depicted on a common time base.

Initially, the alternator 10 is illustrated as maintaining a filtered supply voltage of approximately 1675 V, with the inverter 25 supplying an average load current of approximately 650 A. At time t0, an overcurrent or overvoltage condition is detected, initiating operation of the protection circuit 50 by gating commutation thyristor Qc on and interrupting the gating of series thyristor Qm. Significantly, the current Idc supplied from source 10 to the inverter 25 falls virtually at once to zero, while the load current Iload (representing the combined energy of the motor windings 12a-12c and filter capacitance Cf) decays over a period of time without a sudden change due to the continued gating of the inverter thyristors 14-24.

Meanwhile, the commutation thyristor Qc experiences an initial current surge Icb as the inductive energy stored in the alternator 10 is diverted into commutation capacitor Cc and commutation resistor Rc. When the commutation capacitor voltage Vcc overshoots the source voltage Vdc at time t1, the commutation thyristor is commutated, and the current Icb falls to zero. The commutation capacitor Cc and resistor Rc are sized so that this point substantially coincides with the point at which the inductive energy of alternator 10 is entirely transferred into the protection circuit 50. The resistor current Irc rises with the capacitor voltage Vcc, and then discharges capacitor Cc beginning at time t2, eventually completely discharging capacitor Cc, resetting the protection circuit 50 for the next overcurrent or overvoltage detection.

As indicated above, the capacitor Cc and resistor Rc are sized so that substantially all of the energy stored in alternator 10 is transferred into the protection circuit 50 when the commutation thyristor Qc is commutated off at time t1. The value of capacitor Cc is thus based on the energy storage capability of the alternator inductance. Specifically, the capacitance value should be sufficiently high to limit the maximum capacitor voltage to a safe level; typically, the commutation capacitance is approximately 5%-10% of the capacitance of filter capacitor Cf. The resistor Rc is selected based on two considerations: limiting voltage overshoot on the supply side of the series thyristor Qm, and developing sufficient voltage for commutating thyristor Qc. Once the value of capacitor Cc is chosen, an appropriate resistor value may be solved mathematically or through trial and error.

While the protection circuit of this invention is described in reference to the illustrated embodiment, it is not meant to be limited thereto. For example, the DC supply voltage may be provided by a battery pack or other source. Other modifications and applications will occur to those skilled in the art, and it should be understood that circuits and systems incorporating such modifications may fall within the scope of this invention which is defined by the appended claims.

The embodiments of the invention in which an exclusive property or privilege is claimed are defined as follows:

1. A motor drive apparatus comprising:
   a source for developing a DC supply voltage across a pair of DC supply terminals;

inverter means for supplying alternating current to one or more motor windings from a pair of DC load terminals;

means including a first thyristor for connecting said DC supply terminals to the DC load terminals of said inverter means, the first thyristor being adapted when supplied with a gate signal to enable said source to supply load current to said inverter means;

a commutation circuit including a second thyristor and commutation capacitor connected in series across said DC supply terminals, the second thyristor being adapted when supplied with a gate signal to divert said current supplied by said source; and control means operative in response to a detected fault condition during the supply of load current to said inverter means for interrupting the gate signal supplied to said first thyristor, and supplying a gate signal to said second thyristor, thereby commutating said first thyristor to isolate said source from said inverter means and temporarily maintaining a current path for said source through said second thyristor.

2. The motor drive apparatus set forth in claim 1, wherein said inverter means includes a filter capacitor connected across said DC load terminals, and the first thyristor is commutated during said detected fault condition by a current flow from said filter capacitor to said commutation capacitor.

3. The motor drive apparatus set forth in claim 1, wherein said commutation circuit includes a resistor connected in parallel with said commutation capacitor to limit the voltage developed across said capacitor.

4. The motor drive apparatus set forth in claim 1, wherein the inverter means continues to operate during said detected fault condition, thereby maintaining a current path for said motor windings despite the isolation of said source from said inverter means.

5. Drive apparatus for an AC traction motor, comprising:

source means including an engine driven machine for developing a DC supply voltage across a pair of DC supply terminals;

inverter means for supplying alternating current to one or more windings of said traction motor from a pair of DC load terminals;

means including a first thyristor for connecting said DC supply terminals to the DC load terminals of said inverter means, the first thyristor being adapted when supplied with a gate signal to enable said source means to supply load current to said inverter means;

a commutation circuit including a second thyristor and commutation capacitor connected in series across said DC supply terminals, the second thyristor being adapted when supplied with a gate signal to divert said current supplied by said source means; and control means operative in response to a detected fault condition during the supply of load current to said inverter means for (1) interrupting the gate signal supplied to said first thyristor, (2) supplying a gate signal to said second thyristor, whereby said first thyristor is commutated to isolate said source means from said inverter means and inductive energy stored in said source means is transferred to said commutation capacitor.

6. The motor drive apparatus set forth in claim 5, wherein said commutation circuit includes a resistor connected in parallel with said commutation capacitor to limit the voltage developed across said capacitor.

7. The motor drive apparatus set forth in claim 5, wherein the inverter means continues to operate during said detected fault condition, thereby maintaining a current path for said traction motor windings despite the isolation of said source means from said inverter means.

* * * * *